(12) United States Patent
Nicholls et al.

(10) Patent No.: US 7,245,688 B2
(45) Date of Patent: Jul. 17, 2007

(54) COOLING SYSTEM

(75) Inventors: David Richard Nicholls, Halfway House (ZA); Ivan Drodskie, Lonehill (ZA)

(73) Assignee: Eskom (ZA)

( * ) Notice: Subject to any disclaimer, the term of this patent is extended or adjusted under 35 U.S.C. 154(b) by 0 days.

(21) Appl. No.: 10/311,906

(22) PCT Filed: Nov. 22, 2001

(86) PCT No.: PCT/IB01/02209

§ 371 (c)(1),
(2), (4) Date: Dec. 19, 2002

(87) PCT Pub. No.: WO02/49042

PCT Pub. Date: Jun. 20, 2002

(65) Prior Publication Data

US 2003/0108140 A1    Jun. 12, 2003

(30) Foreign Application Priority Data

Dec. 14, 2000 (ZA) ................................. 2000-7501

(51) Int. Cl.
*G21C 9/00* (2006.01)

(52) U.S. Cl. ...................... 376/298; 376/299; 376/282; 376/283

(58) Field of Classification Search ................ 376/282, 376/283, 298, 299
See application file for complete search history.

(56) References Cited

U.S. PATENT DOCUMENTS

| | | | |
|---|---|---|---|
| 3,230,373 A | | 1/1966 | Montgomery |
| 3,621,926 A | * | 11/1971 | Townsend .................... 376/372 |
| 3,625,817 A | * | 12/1971 | Anderson .................... 376/282 |
| 3,718,539 A | * | 2/1973 | West et al. .................. 376/283 |
| 3,865,688 A | * | 2/1975 | Kleimola ..................... 376/283 |
| 3,951,164 A | * | 4/1976 | Crist ............................ 137/218 |
| 3,984,282 A | * | 10/1976 | Kleimola ..................... 376/282 |
| 4,239,596 A | * | 12/1980 | Bevilacqua et al. ........ 376/299 |
| 4,362,693 A | * | 12/1982 | Bukrinsky et al. .......... 376/298 |

(Continued)

FOREIGN PATENT DOCUMENTS

DE    3337415 A1    4/1985

(Continued)

OTHER PUBLICATIONS

PCT International Search Report for International Patent Application No. PCT/US2000/01416 (cited references listed above).

*Primary Examiner*—Ricardo J. Palabrica
(74) *Attorney, Agent, or Firm*—Howrey LLP (57) ABSTRACT

This invention relates to a nuclear reactor plant which includes a nuclear heat source (12), and a cooling system (10). The cooling system (10) includes at least two cooling circuits (26), each of which includes a plurality of coolant chambers (18) each having an inlet (40) and an outlet (42), the coolant chambers (18) being arranged around the nuclear heat source (12). The cooling system (10) further includes pump means (52) for pumping coolant to and from the coolant chambers (18), the volumetric capacity of the coolant chambers (18) being sufficiently large such that, when in a passive mode, the temperature of a water coolant in the coolant chambers (18) will remain below boiling point for at least eight hours.

31 Claims, 7 Drawing Sheets

U.S. PATENT DOCUMENTS

| | | | |
|---|---|---|---|
| 4,473,528 A | 9/1984 | Kleimola | 376/282 |
| 4,702,879 A * | 10/1987 | Tower et al. | 376/282 |
| 4,753,771 A * | 6/1988 | Conway et al. | 376/282 |
| 5,000,907 A * | 3/1991 | Chevereau et al. | 376/282 |
| 5,043,136 A | 8/1991 | Hunsbedt et al. | 376/299 |
| 5,049,353 A * | 9/1991 | Conway et al. | 376/293 |
| 5,082,619 A * | 1/1992 | Sawyer | 376/283 |
| 5,096,659 A | 3/1992 | Hidaka et al. | 376/283 |
| 5,102,617 A * | 4/1992 | Gluntz et al. | 376/283 |
| 5,135,711 A | 8/1992 | Borchardt et al. | 376/372 |
| 5,202,084 A | 4/1993 | Fennern et al. | 376/433 |
| 5,268,942 A * | 12/1993 | Newton et al. | 376/272 |
| 5,377,242 A * | 12/1994 | Carlton et al. | 376/282 |
| 5,426,681 A | 6/1995 | Aburomia | 376/283 |
| 5,517,539 A * | 5/1996 | Corpora et al. | 376/310 |
| 5,825,838 A * | 10/1998 | Park et al. | 376/299 |
| 5,828,714 A * | 10/1998 | De Venne | 376/299 |
| 6,269,833 B1 * | 8/2001 | Hein et al. | 137/216 |
| 2004/0028171 A1 | 2/2004 | Nicholls | 376/402 |

FOREIGN PATENT DOCUMENTS

| | | | |
|---|---|---|---|
| DE | 3731908 A1 | 4/1989 | |
| EP | 04072597 | 3/1992 | 15/18 |
| EP | 08062374 | 3/1996 | 15/18 |
| FR | 2762436 | 10/1998 | |
| GB | 2157880 | 10/1985 | |

* cited by examiner

COOLING SYSTEM

This application claims priority under 35 USC §371 of International application number PCT/IB01/02209, filed 22 Nov. 2001 which claims priority to South African application number 2000/7501, filed 14 Dec. 2000.

THIS INVENTION relates to a nuclear reactor plant. More particularly it relates to a cooling system. It also relates to a method of constructing a nuclear reactor plant and to a method of operating a nuclear reactor plant. It also relates to a method of cooling a nuclear heat source.

In a nuclear reactor plant, use is often made of a coolant such as inhibited demineralized water, to cool the reactor and a cavity defined within a citadel in which cavity the reactor is positioned.

According to one aspect of the invention, there is provided a cooling system which includes at least two sets of coolant chambers each set of coolant chambers comprising a plurality of coolant chambers arranged around a heat source;

a coolant inlet pipe which enters each coolant chamber at a high level and extends downwardly through the coolant chamber to a discharge end positioned at a low level within the coolant chamber; and an outlet leading from each coolant chamber at a high level, the inlet pipes and outlets of coolant chambers of an associated set being connected in parallel.

Accordingly, the cooling system may include, associated with each set of coolant chambers, an inlet header and an outlet header with which the inlet pipes and outlets, respectively, are connected in flow communication.

In a preferred embodiment of the invention, the cooling system includes three sets of coolant chambers, each of which has its own associated inlet header and outlet header to which the cooling chambers in an associated set are connected in flow communication.

According to another aspect of the invention, there is provided a nuclear reactor plant which includes a nuclear heat source;

a housing within which the heat source is based, an inner surface of the housing being spaced from the heat source such that an annular space is defined between the heat source and the housing; and a cooling system which includes a plurality of coolant chambers arranged around the heat source within the annular space, each coolant chamber being circular cylindrical for at least part of its length and having an inlet, an outlet and a diameter of at least 250 mm.

Preferably, each coolant chamber has a diameter of about 600 mm.

In one embodiment of the invention, the heat source may be a nuclear reactor.

In another embodiment of the invention, the heat source may be a used-fuel storage facility within which used nuclear reactor fuel is stored.

According to yet another aspect of the invention there is provided a nuclear reactor plant which includes a nuclear heat source; and a cooling system which includes at least two cooling circuits, each of which includes a plurality of coolant chambers, each having an inlet and an outlet, the coolant chambers being arranged around the nuclear heat source; and pump means for pumping coolant to and from the coolant chambers, the volumetric capacity of the coolant chambers being sufficiently large such that, when in a passive mode, the temperature of a water coolant in the coolant chambers will remain below boiling point for at least 8 hours.

By "passive mode" is meant that there is no circulation of water coolant to or from the coolant chambers and cooling is dependent on the thermal capacity of the volume of water coolant contained within the coolant chambers. This arrangement facilitates safe operation of the plant even under abnormal operating conditions by providing adequate cooling even in the event of a pump failure.

The volumetric capacity of the coolant chambers may be sufficiently large such that, when in a passive mode, the temperature of a water coolant in the coolant chambers will remain below boiling point for up to about 24 hours. This, it is believed, will provide sufficient time to permit a maintenance crew to effect most repairs which may be required.

Preferably, the volumetric capacity of the coolant chambers is selected such that, in a passive mode, a water coolant contained within the coolant chambers will reach a maximum temperature of about 80° C. after about 24 hours. The volumetric capacity of the coolant chambers may be about 200 m$^3$.

The heat source may be a nuclear reactor, the plant including a housing which defines a chamber within which the reactor is housed, and the coolant chambers being positioned in an annular space defined within the chamber between the reactor and an inner surface of the housing.

The housing is typically a citadel formed of concrete. The reactor plant may include a support, secured to the housing, for supporting the coolant chambers in position. The support may be in the form of a ring which is set into the concrete of the housing.

The coolant chambers may be defined by steel vessels which are hollow, have a circular cylindrical generally vertical tubular wall and closed ends. In order to avoid the formation of hot spots on the vessels, a shield may be provided between the reactor and the vessels. The shield may be of metal, such as steel, and may have a thickness of about 3 mm. The shield, in addition to inhibiting the formation of hot spots on the vessels, serves to protect the reactor from water impingement in the event of a leak in a component of the cooling system positioned in the citadel.

The cooling system may include at least two, and preferably at least three, independent cooling circuits, each circuit including a plurality of coolant chambers, connected in parallel, and pump means for circulating the water coolant around the circuit. Each cooling circuit may include an inlet header to which the inlet of each coolant chamber of the circuit is connected, and an outlet header to which the outlet of each coolant chamber of the circuit is connected.

In one embodiment of the invention, the inlet and outlet headers may be positioned in the housing.

In another embodiment of the invention, the headers may be provided outside the housing. In a preferred embodiment of the invention, the headers are positioned in a recess in an outer surface of the housing. This arrangement has the advantage that more space is provided within the housing and that safety is improved.

Each cooling circuit may include a heat exchanger 51 connected in flow communication between the outlet header and the inlet header.

The plant may include an auxiliary heat exchanger 53 associated with each circuit and a valve arrangement whereby each auxiliary heat exchanger is connectable in flow communication with the relevant circuit in the event of normal water circulation being interrupted. The auxiliary heat exchanger may be in the form of a cooling tower.

The inlet of each coolant chamber may be defined by an inlet pipe, one end of which is connected to the associated inlet header, the inlet pipe extending from the inlet header and entering the coolant chamber at a high level from where it extends downwardly through the coolant chamber to a discharge end positioned at a low level.

The outlet of each coolant chamber may lead from the coolant chamber at a high level and be connected in flow communication with the associated outlet header by a length of pipe.

The cooling system may include anti-siphon means to reduce the risk, in the event of a breach in the cooling system, that coolant will be siphoned from one or more of the coolant chambers through the inlet pipes.

The anti-siphon means may include an anti-siphon valve mounted in each inlet pipe, typically at a highest point thereof.

Instead, or in addition, the anti-siphon means may include at least one anti-siphon bleed opening provided in that portion of the coolant inlet pipe positioned within the coolant chamber at a position spaced from the discharge end, whereby the coolant inlet pipe and the coolant chamber are connected or connectable in flow communication.

Preferably, a plurality of anti-siphon bleed openings is provided in that portion of the coolant inlet pipe which is positioned at the highest level within the coolant chamber.

The anti-siphon bleed openings may be in the form of holes in the inlet pipe, the holes being dimensioned to be sufficiently small so that, in normal use, the small amount of coolant flowing therethrough into the coolant chamber will have no or little detrimental effect on the cooling system, and sufficiently large so that, in the event of coolant being siphoned from the coolant chamber, when the coolant level in the coolant chamber falls below the level of the holes, sufficient air will be drawn from the coolant chamber into the coolant inlet pipe to break the vacuum and inhibit the siphoning.

In an inlet pipe having a nominal diameter of about 100 mm, typically between about 4 and 8 anti-siphon bleed openings will be provided. The bleed openings will typically be circular and have a diameter of between about 5 and 10 mm.

The nuclear reactor plant may include a steam relief system whereby steam in the coolant chambers can be exhausted therefrom. The steam relief system may include a steam header with which the coolant chambers are connectable in flow communication, and a steam exhaust line leading from the steam header to atmosphere. The steam header may be positioned in the housing, the steam exhaust line extending downwardly from the steam header and exiting the housing at a low level, thereby reducing the risk that a draught may be created within the housing by a chimney effect. Instead, the steam header may be positioned outside the housing. Each coolant chamber may be connectable in flow communication with the steam header by means of a pressure and/or temperature-activated steam release device.

The nuclear reactor plant may include a fire protection system 55 and connection means whereby the fire protection system 55 can be connected in flow communication with the coolant chambers to permit water to be supplied to the coolant chambers from the fire protection system 55.

According to still another aspect of the invention, in a nuclear plant which includes a nuclear heat source, a closed loop cooling system having a plurality of coolant chambers arranged around the heat source, and pump means for circulating coolant around the cooling system there is provided a method of cooling the nuclear heat source in the event of loss of circulation of coolant, which method includes the step of connecting the coolant chambers in flow communication with a back-up heat exchanger.

In the event that coolant circulation is no longer possible, e.g. as a result of loss of power to cooling circuit components or damage to components of the cooling system, then the method may include isolating the coolant chambers so that they operate in a passive mode.

According to yet another aspect of the invention, there is provided a method of constructing a nuclear reactor plant having a reactor cavity and at least two sets of coolant chambers, each set including a plurality of coolant chambers at least partially surrounding the reactor cavity, which method includes providing, in at least some of the coolant chambers, a coolant inlet pipe which enters the coolant chamber at a high level and extends downwardly through the coolant chamber to a discharge end positioned at a low level in the coolant chamber.

According to still a further aspect of the invention there is provided a method of operating a nuclear reactor plant having a nuclear heat source, which method includes the step of providing a plurality of coolant chambers around the heat source, the volumetric capacity of the coolant chambers being such that, in a passive mode, coolant contained therein provides sufficient cooling capacity for at least 24 hours.

The volumetric capacity of the coolant chambers may be such that coolant contained therein provides sufficient cooling capacity for up to about 6 days.

Preferably, the volumetric capacity of the coolant chambers is such that the temperature of a water coolant contained therein will not exceed 80° C. after about 24 hours.

The method may include, in the event of loss of coolant, supplementing the coolant from a fire protection system or other external coolant supply points.

The method may further include, in order to avoid excessive pressure build-up within the coolant chambers, venting steam generated in the coolant chambers therefrom. The steam may be vented to atmosphere.

The invention will now be described, by way of example, with reference to the accompanying diagrammatic drawings.

In the drawings.

In the drawings, reference numeral 10 refers generally to part of a cooling system of a nuclear reactor plant in accordance with the invention. In the embodiment shown, the cooling system is used to cool the nuclear reactor 12.

Instead, or in addition, the cooling system may be used for cooling a used-fuel storage facility.

Figure 2:
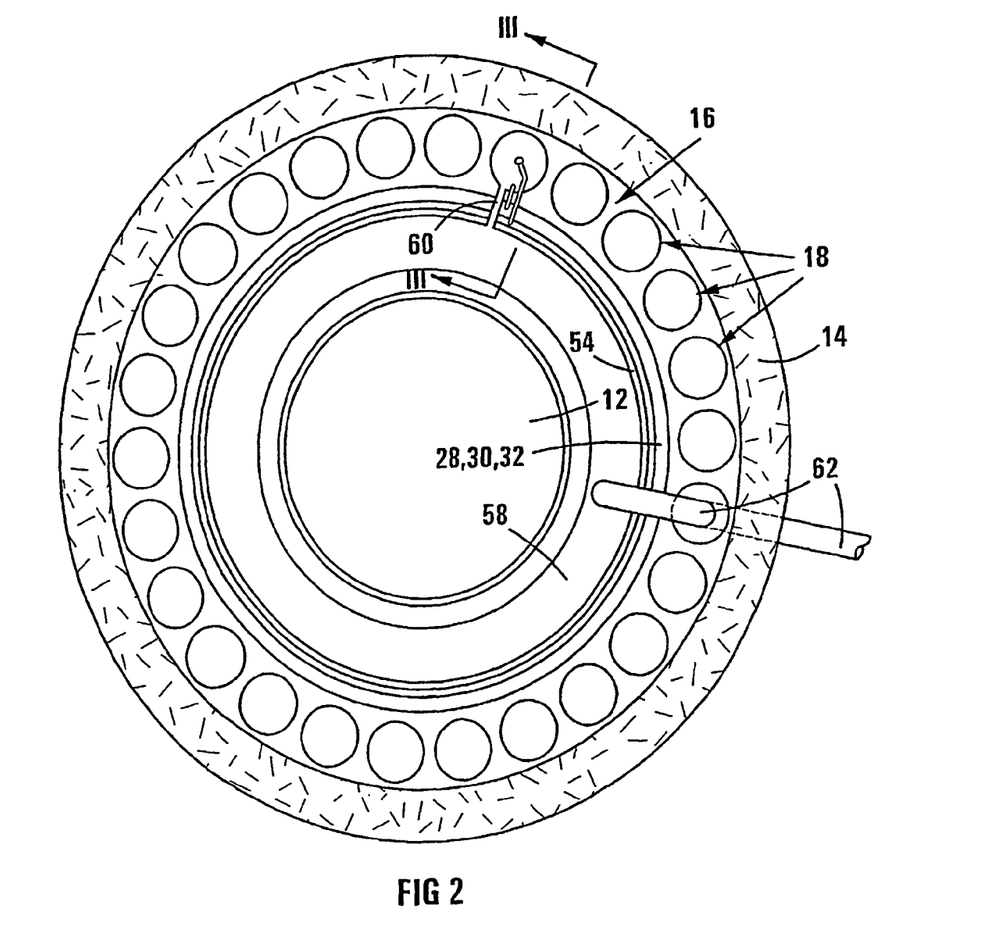
FIG. 2 shows a transverse sectional elevation through a citadel within which a nuclear reactor is housed illustrating the general arrangement of cooling system elements around the reactor.

As can best be seen in FIG. 2 of the drawings, the nuclear reactor 12 is positioned in a cavity defined within a housing in the form of a concrete shell or citadel 14. An annular space 16 is defined between an outer surface of the reactor 12 and an inner surface of the citadel 14.

The cooling system 10 includes three sets of coolant chambers 18 positioned in the space 16.

Figure 3:
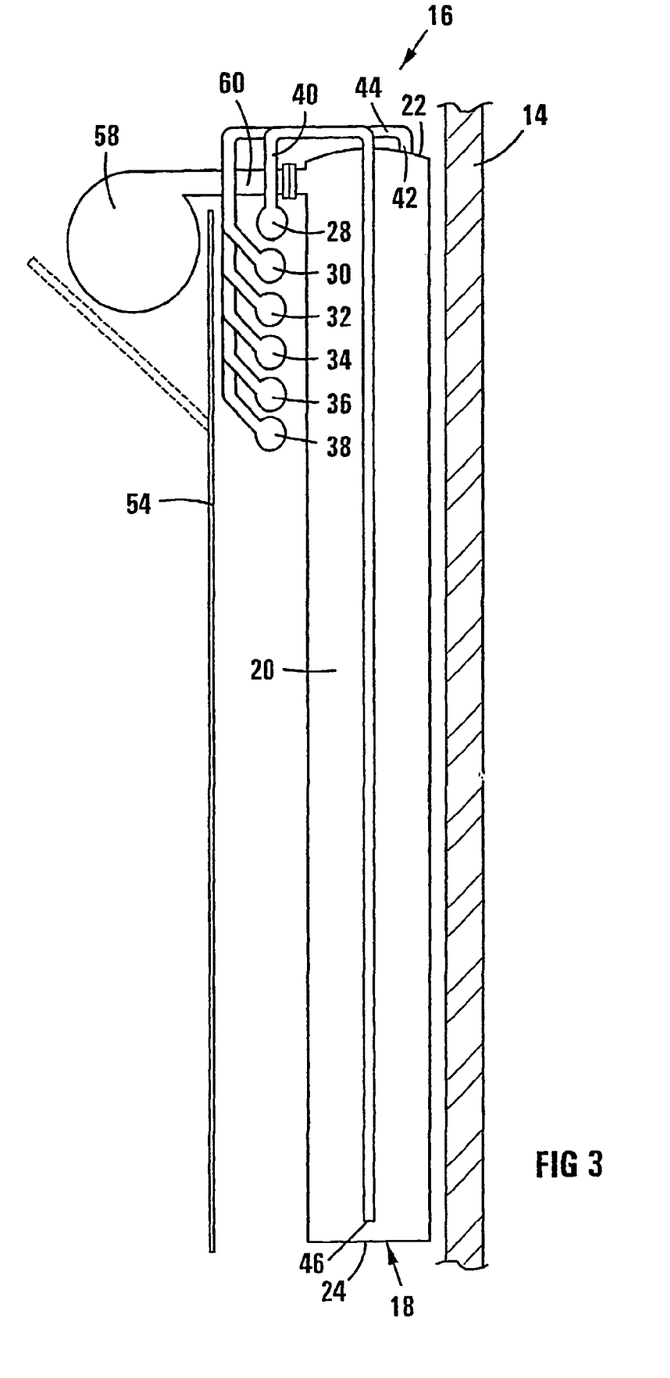
FIG. 3 shows a sectional view taken at III—III in FIG. 2.
Figure 4:
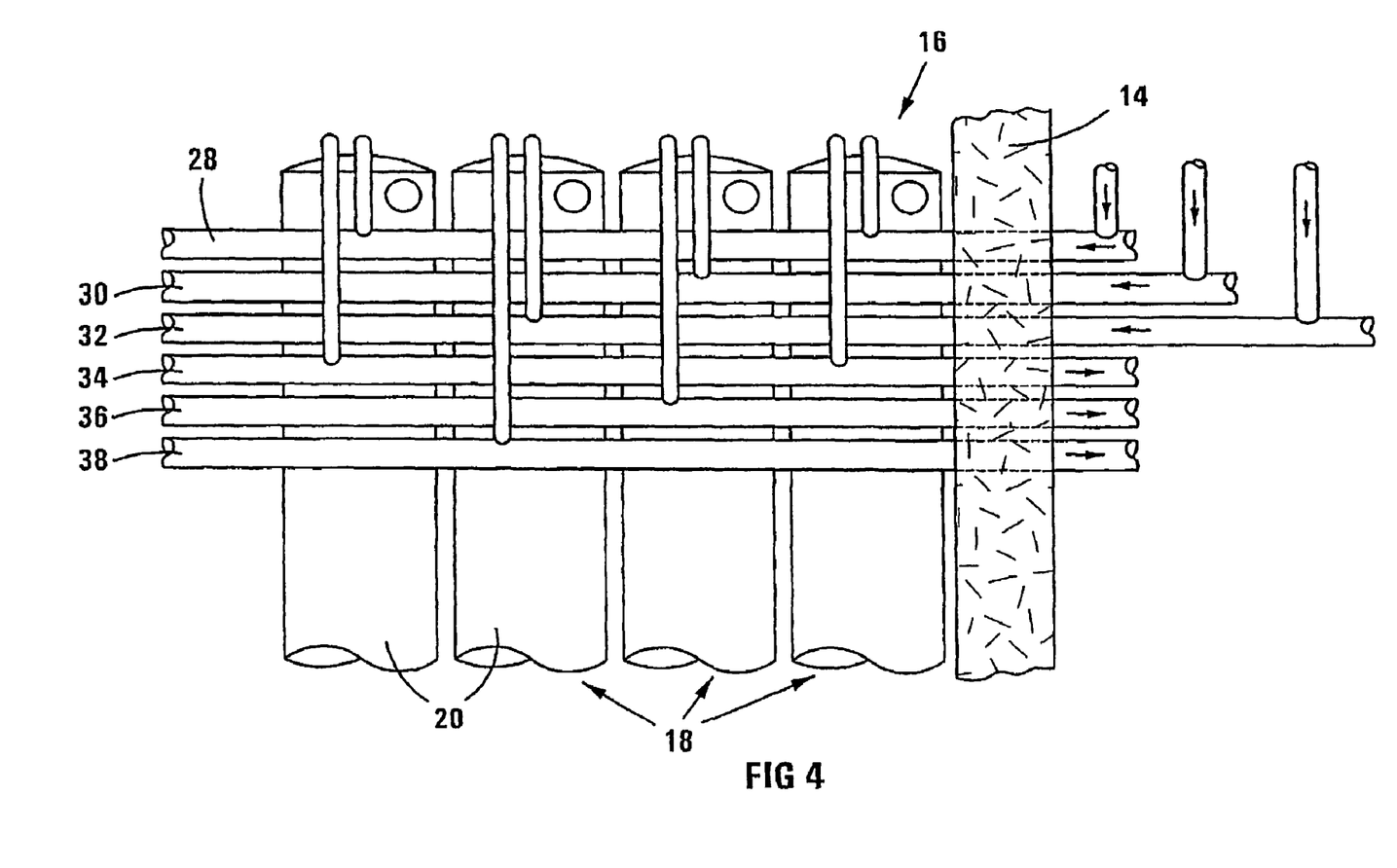
FIG. 4 shows the upper ends of a plurality of coolant chambers and inlet and outlet headers with which the coolant chambers of the cooling system are connected in flow communication.

As can best be seen in FIGS. 3 and 4 of the drawings, each coolant chamber 18 is defined by a steel vessel having a circular cylindrical wall 20, typically in the form of a length of pipe, and a top 22 and bottom 24 which seal off ends of the wall 20.

Figure 1:
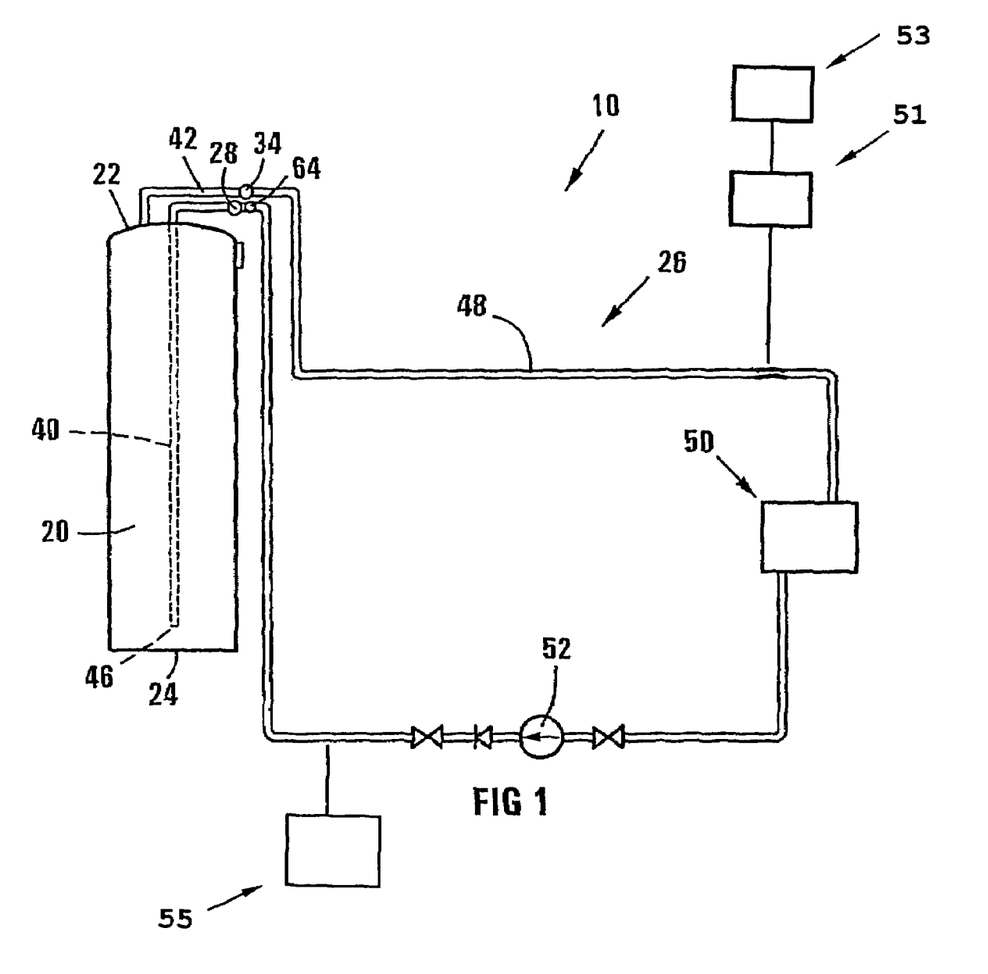
FIG. 1 shows a schematic layout of part of a nuclear reactor plant, and in particular part of a cooling system thereof.

Each set of coolant chambers 18 forms part of a cooling circuit, part of one of which is generally indicated by reference numeral 26 in FIG. 1. Hence, the cooling system includes three independent cooling circuits 26.

The cooling system 10 includes three inlet headers 28, 30, 32 and three outlet headers 34, 36, 38. The inlet header 28 and outlet header 34 form part of one cooling circuit 26. Each coolant chamber 18 in said one cooling circuit 26 has an inlet defined by a coolant inlet pipe 40, which is connected in flow communication with the inlet header 28 as described in more detail herebelow, and an outlet 42 connected, via a length of pipe 44, in flow communication with the outlet header 34. Similarly, the inlet header 30 and outlet header 36 and the inlet header 32 and outlet header 38 form part of the other two cooling circuits and their associated coolant chambers are connected in flow communication therewith. Each coolant inlet pipe 40 is connected to its associated inlet header 28, 30, 32 and extends downwardly through a centre of the top 22 of the vessel to the bottom 24 of the coolant chamber 18 where it terminates in a discharge end 46. The outlet 42 leads from the vessel at a high level and is connected via the length of pipe 44 to the associated outlet header 34, 36, 38.

The inlet header 28, 30, 32 and outlet header 34, 36, 38 of each cooling circuit is connected via piping 48 and other cooling circuit elements, generally indicated by reference numeral 50, to a pump 52. Hence, each cooling circuit is a closed loop cooling system.

In order to ensure safe operation of the plant, the cooling capacity of the cooling circuits is typically such that each cooling circuit provides at least 50% of the required cooling capacity so that the plant can operate safely with only two of the cooling circuits in operation.

The reactor plant includes a support (not shown) secured to the citadel 14 for supporting the vessels within which the coolant chambers 18 are defined. The support is typically in the form of a ring which is set into the concrete of the citadel 14.

A metal shield 54 (FIGS. 2 and 3) is provided between the reactor 12 and the coolant chambers 18. The shield 54 is typically about 3 mm thick and serves both to inhibit the formation of hot spots on the coolant chamber vessels and to protect the reactor from water impingement in the event of water leakage from the cooling system 10 within the citadel 14.

Figure 6:
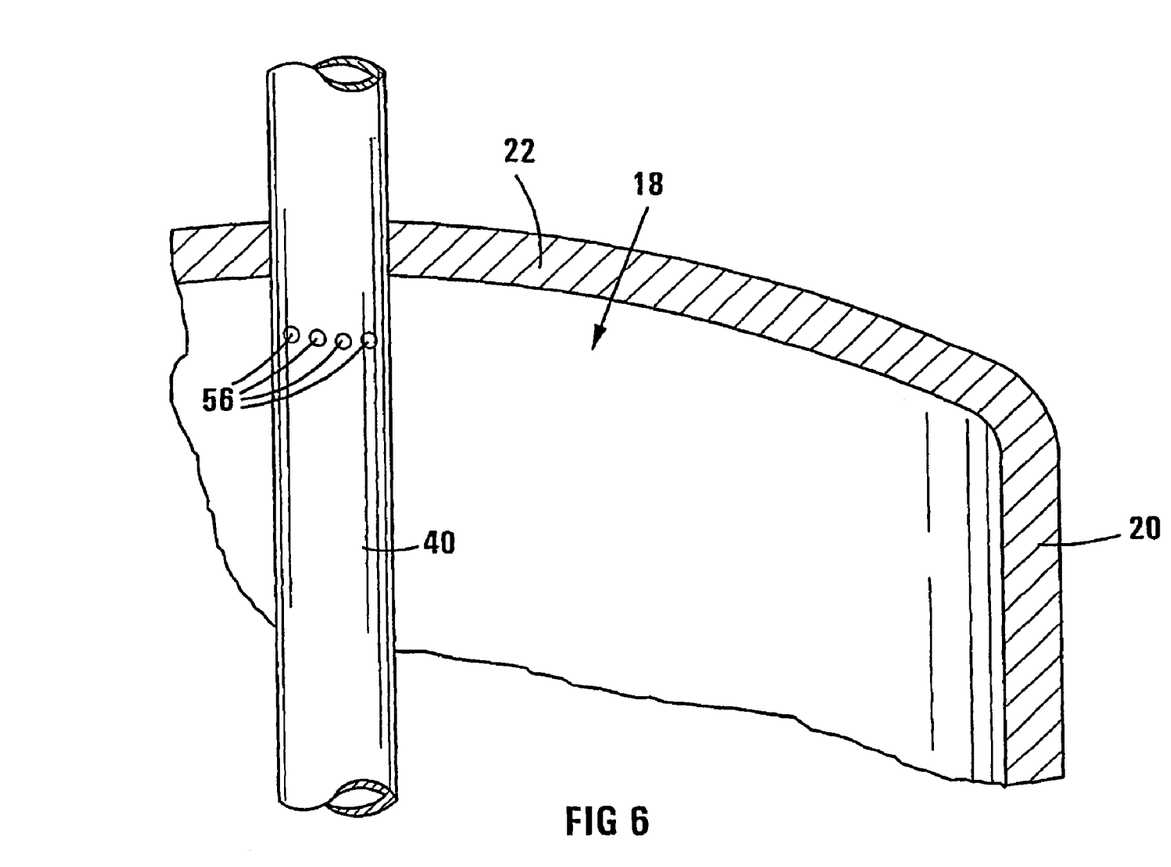
FIG. 6 shows, on an enlarged scale, part of a coolant inlet pipe forming part of the cooling system.

As can best be seen in FIG. 6 of the drawings, a plurality of anti-siphon bleed openings in the form of holes 56 is provided in the highest portion of the coolant inlet pipe 40 positioned within each coolant chamber 18.

The plant further includes a steam header 58 (FIGS. 2 and 3) mounted within the citadel 14. A steam pipe 60 extends between each coolant chamber 18 and the steam header 58 with suitable valving being provided, selectively to connect the coolant chambers 18 in flow communication with the steam header 58 via the steam pipes 60. The valving will typically be temperature and/or pressure-activated thereby automatically to connect the coolant chamber 18 in flow communication with the steam pipe 60 to vent steam from the coolant chamber 18 and avoid excessive pressure build up therein.

Figure 5:
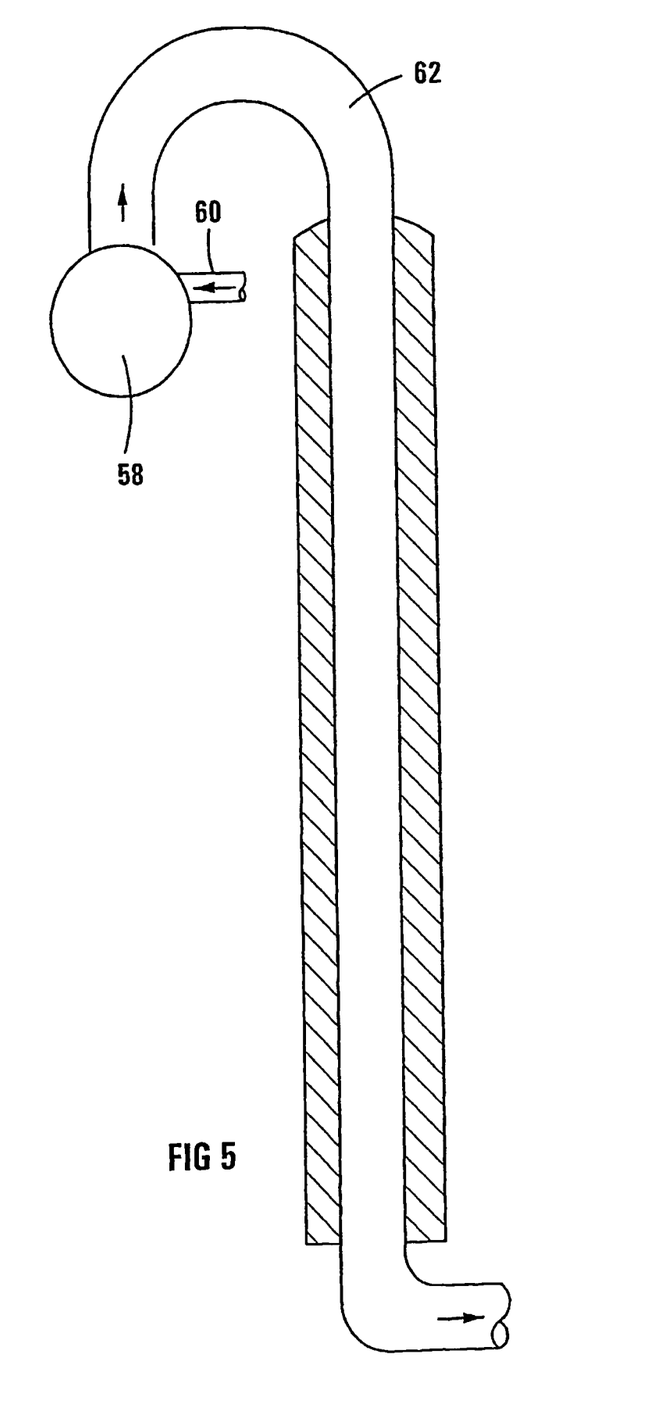
FIG. 5 shows part of a steam relief system of the plant.

The steam header 58 is mounted at a high level within the citadel 14 and a steam duct 62 is connected to an outlet of the steam header 58 and extends downwardly therefrom through a coolant chamber 18 from where it exits the citadel 14 at a low level (FIG. 5).

If desired, an upper portion of the shield 54 is inclined upwardly inwardly (as shown in broken lines in FIG. 3 of the drawings) such that it is positioned inwardly of the steam header 58 to protect the reactor from steam impingement in the event of a leak in the steam header 58.

Figure 7:
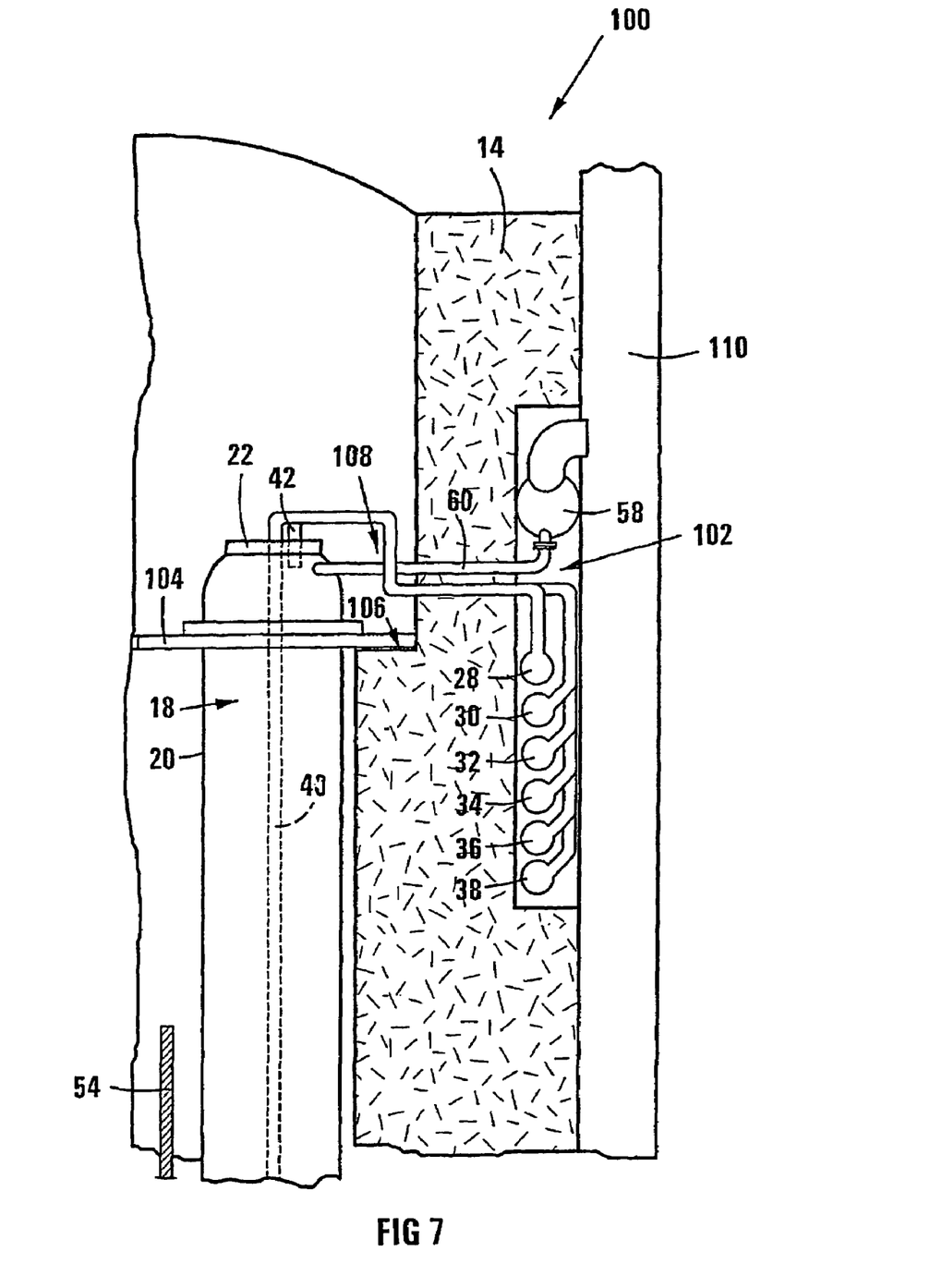
FIG. 7 shows a sectional side view, similar to FIG. 3, of part of the citadel of another nuclear reactor plant in accordance with the invention.

Reference is now made to FIG. 7 of the drawings, in which reference numeral 100 refers generally to part of a cooling system of another nuclear reactor plant in accordance with the invention and, unless otherwise indicated, the same reference numerals used above are used to designate similar parts.

The main difference between the cooling system 100 and the cooling system 10 is that, in the case of the cooling system 100, the headers 28, 30, 32, 34, 36, 38 as well as the steam header 58 are positioned outside the citadel 14 in a recess 102 defined in an outer surface of the citadel 14. Suitable piping extends through the wall of the citadel 14 to connect the coolant chambers 18 in flow communication with the headers. Further, the steam header 58 exhausts into a depressurisation duct 110.

An advantage with this arrangement is that more space is provided within the cavity defined within the citadel 14 within which control elements and the like can be housed. In addition, the safety of the reactor is improved since leakage in one of the headers will not result in water or steam impingement onto the reactor.

Also shown in FIG. 7 of the drawings, is a ring 104 which forms a support from which the vessels, within which the coolant chambers 18 are defined, are suspended. The ring 104 is supported on a shoulder 106 defined by a rebate 108 on an inner surface of a wall of the citadel 14.

In use, the pump 52 of each cooling circuit pumps coolant, typically in the form of inhibited demineralised water, to the inlet header 28, 30, 32 of the associated circuit. The water then flows from the inlet header 28, 30, 32 to the associated coolant chambers 18 through the coolant inlet pipes 40 where it is discharged into the coolant chambers 18 at a low level through the discharge ends 46 of the associated coolant inlet pipes 40.

The coolant flows upwardly through the coolant chambers 18 extracting heat from the reactor and the reactor cavity, and the heated coolant then flows from the coolant chambers 18 through the pipes 44 to the outlet headers 34, 36, 38. The heated coolant in each coolant circuit flows to a heat exchanger (not shown) where it is cooled and recycled.

In the event of a breach or rupture in the piping outside the citadel 14, the possibility exists that, depending upon the position of the breach, coolant will be siphoned from one or more of the coolant chambers 18 of one of the cooling circuits through the associated coolant inlet pipes 40. However, as the level of coolant in the coolant chambers 18 falls below the level of the holes 56, air from the coolant chambers 18 will flow into the coolant inlet pipes 40 thereby breaking the vacuum and stopping the siphoning to ensure that a relatively high level of coolant remains within the coolant chambers 18.

If necessary, the reactor 12 can be shut down and remedial action taken, e.g. by repairing the breach.

The holes 56 are typically dimensioned so that in normal use, coolant being pumped by the pumps 52 which leaks through the holes 56 into the coolant chambers 18 will have no or little detrimental effect on the cooling system. However, the holes 56 are sufficiently large to bleed enough air into the coolant inlet pipes 40 to break the vacuum and stop the siphoning process. Naturally, the dimensions may vary depending upon the intended application. However, the Inventors believe that in an inlet pipe 40 having a nominal diameter of about 100 mm, typically between about 4 and 8 holes of between about 5 and 10 mm diameter will be provided.

If desired, an anti-siphon valve 64 (FIG. 1) can be mounted upstream of the inlet header 28, 30, 32, typically at the highest point in the piping network. The anti-siphon valve 64 is configured to open when the pressure in the affected pipe drops below atmospheric pressure, thereby permitting air to enter the affected pipe so as to equalise the pressure and stop the siphoning action.

An advantage of the cooling system 10, 100 in accordance with the invention is that the coolant chambers 18 have a relatively large volumetric capacity. Hence, the coolant contained within the coolant chambers 18 at any one time has a relatively high thermal capacity. This permits the plant to operate for an extended period of time in a passive mode, i.e. where no water coolant is being circulated. Hence, for example, if all power to the cooling circuit components is lost, or if the distribution pipe work outside the citadel 14 is damaged, the cooling chambers 18 and headers within the citadel 14 are isolated automatically. The volumetric capacity of the coolant chambers 18 is selected such that it provides for a period of about 24 hours during which the water temperature will rise to about 80° C. Repairs to the pumping systems during this period will restore normal operation without any damage to the systems, or loss of generating output.

Should the cooling system repairs not be completed within the first 24 hours, the tops 22 of the coolant chambers 18 will open under the increased pressure and temperature, and the water in the chambers 18 will be allowed to boil off at atmospheric pressure. Steam and water expelled from the chambers 18 will enter the steam header 58 where the steam will be separated from the water and expelled to atmosphere via the steam duct 62. In this way, heat from the reactor will be absorbed by the latent heat of the boiling water, and dissipated to the atmosphere. This will allow a further five or six days for repairs to be done, and for the reactor decay heat to be reduced.

Should this time period still not be enough to repair the systems, water from the fire protection system may be pumped into the coolant chambers 18 to replace water loss by evaporation.

It is a further advantage of the invention that the required cooling capacity of the plant is provided by a plurality of coolant chambers such that, in the event of failure of any one coolant chamber, a back-up exists. Still a further advantage of the cooling system/nuclear reactor plant of the invention is that in a passive operating mode, there is no connection to, nor reliance on, any external cooling tower, which could be damaged by accident or sabotage.

Accordingly, the Inventors believe that the cooling system 10, 100 in accordance with the invention will ensure the safe operation of the nuclear reactor plant.

The invention claimed is:

1. A nuclear reactor plant which includes
   a nuclear heat source;
   a housing within which the heat source is housed, an inner surface of the housing being spaced from the heat source such that an annular space is defined between the heat source and the housing; and
   a cooling system which includes
      at least two cooling circuits, each of which includes a plurality of coolant chambers arranged around the heat source within the annular space; and
      pump means configured to pump coolant to and from the coolant chambers, each coolant chamber being defined by a generally vertical tubular wall and a top and closed bottom connected respectively to the tubular wall top and tubular wall bottom, with a coolant inlet pipe which is connected in flow communication with an outlet of the pump entering the coolant chamber through or adjacent the top extending downwardly through the coolant chamber and terminating at a discharge end and an outlet leading from the coolant chamber which is connected in flow communication with an inlet side of the pump, the volumetric capacity of the coolant chambers being sufficiently large such that, when in a passive mode, i.e. in the event of a failure of the pump means, the plant can continue to operate and the temperature of a water coolant in the coolant chambers will remain below boiling point for at least 8 hours.

2. A nuclear reactor plant as claimed in claim 1, in which the volumetric capacity of the coolant chambers is sufficiently large such that, when in a passive mode, the temperature of a water coolant in the coolant chambers will remain below boiling point for up to 24 hours.

3. A nuclear reactor plant as claimed in claim 2, in which the volumetric capacity of the coolant chambers is selected such that, in a passive mode, a water coolant contained within the coolant chambers will reach a maximum temperature of 80° C. after 24 hours.

4. A nuclear reactor plant as claimed in claim 1, in which the housing is formed of concrete.

5. A nuclear reactor plant as claimed in claim 4, which includes a support secured to the housing for supporting the coolant chambers in position.

6. A nuclear reactor plant as claimed in claim 5, in which the support is in the form of a ring which is set into the concrete of the housing.

7. A nuclear reactor plant as claimed in claim 1, in which the coolant chambers are defined by steel vessels which are hollow and have a circular cylindrical generally vertical tubular wall.

8. A nuclear reactor plant as claimed in claim 7, in which, in order to avoid the formation of hot spots on the vessels, a shield is provided between the reactor and the vessels.

9. A nuclear reactor plant as claimed in claim 7, in which the shield is of metal and has a thickness of 3 mm.

10. A nuclear reactor plant as claimed in claim 1, in which each cooling circuit includes an inlet header to which the inlet pipe of each coolant chamber of the cooling circuit is connected and an outlet header to which the outlet of each coolant chamber of the cooling circuit is connected.

11. A nuclear reactor plant as claimed in claim 10, in which the inlet and outlet headers are positioned in the housing.

12. A nuclear reactor plant as claimed in claim 10, in which the inlet and outlet headers are provided outside the housing.

13. A nuclear reactor plant as claimed in claim 12, in which the headers are positioned in a recess in an outer surface of the housing.

14. A nuclear reactor plant as claimed in claim 10, in which each cooling circuit includes a heat exchanger connected in flow communication between the outlet header and the inlet header.

15. A nuclear reactor plant as claimed in claim 10, which includes an auxiliary heat exchanger associated with each cooling circuit, and a valve arrangement whereby the auxiliary heat exchanger is connectable in flow communication with the cooling circuit in the event of normal water circulation being interrupted.

16. A nuclear reactor plant as claimed in claim 15, in which the auxiliary heat exchanger is in the form of a cooling tower.

17. A nuclear reactor plant as claimed in claim 1, in which the cooling system includes anti-siphon means for reducing the risk, in the event of a breach in the cooling system, that coolant will be siphoned from one or more of the coolant chambers through the inlet pipes.

18. A nuclear reactor plant as claimed in claim 17, in which the antisiphon means includes an anti-siphon valve mounted in each inlet pipe.

19. A nuclear reactor plant as claimed in claim 17, in which the anti-siphon means includes at least one anti-siphon bleed opening provided in that portion of the coolant inlet pipe positioned within the coolant chamber at a position spaced from the discharge end and whereby the coolant inlet pipe and the coolant chamber are connectable in flow communication.

20. A nuclear reactor plant as claimed in claim 19, in which a plurality of anti-siphon bleed openings is provided in that portion of the coolant inlet pipe which is positioned at the highest level within the coolant chamber.

21. A nuclear reactor plant as claimed in claim 20, in which the antisiphon bleed openings are in the form of holes in the inlet pipe, the holes being dimensioned to be sufficiently small so that, in normal use, an amount of coolant flowing therethrough into the coolant chamber will have no or little detrimental effect on the cooling system, and sufficiently large so that, in the event of coolant being siphoned from the coolant chamber, when the coolant level in the coolant chamber falls below the level of the holes, sufficient air will be drawn from the coolant chamber into the coolant inlet pipe to break a vacuum and inhibit the siphoning.

22. A nuclear reactor plant as claimed in claim 10, which includes a steam relief system whereby steam in the coolant chambers can be exhausted from the coolant chambers.

23. A nuclear reactor plant as claimed in claim 22, in which the steam relief system includes a steam header with which the coolant chambers are connectable in flow communication, and a steam exhaust line leading from the steam header to atmosphere.

24. A nuclear reactor plant as claimed in claim 23, in which the steam header is positioned in the housing, the steam exhaust line extending downwardly from the steam header and exiting the housing at a low level.

25. A nuclear reactor plant as claimed in claim 23, in which the steam header is positioned outside the housing.

26. A nuclear reactor plant as claimed in claim 23, in which each coolant chamber is connectable in flow communication with the steam header by means of a pressure and/or temperature-activated steam release device.

27. A nuclear reactor plant as claimed in claim 10, which includes a fire protection system and connection means whereby the fire protection system is connectable in flow communication with the coolant chambers to permit water to be supplied to the coolant chambers from the fire protection system.

28. A nuclear reactor plant as claimed in claim 1, wherein each coolant chamber has a diameter of at least 250 mm.

29. A nuclear reactor plant as claimed in claim 28, in which each coolant chamber has a diameter of 600 mm.

30. A nuclear reactor plant as claimed in claim 28, in which the heat source is a nuclear reactor.

31. A nuclear reactor plant as claimed in claim 28, in which the heat source is a used-fuel storage facility within which used nuclear reactor fuel is stored.

* * * * *